United States Patent
Wang et al.

(10) Patent No.: US 7,894,337 B2
(45) Date of Patent: Feb. 22, 2011

(54) METHOD AND SYSTEM FOR UNIFIED OVERLOAD AND OVERFLOW CONTROL TO SUPPORT VOIP AND MULTIPLE QOS FLOW TRAFFIC IN COMMUNICATION NETWORK

(75) Inventors: Liwa Wang, Morris Plains, NJ (US); Pengfei Zhu, Morris Plains, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 556 days.

(21) Appl. No.: 11/824,114

(22) Filed: Jun. 29, 2007

(65) Prior Publication Data
US 2009/0003215 A1    Jan. 1, 2009

(51) Int. Cl.
*G01R 31/08* (2006.01)
(52) U.S. Cl. .................................................. 370/229
(58) Field of Classification Search .............. 370/236.1, 370/229, 468, 328, 338
See application file for complete search history.

(56) References Cited

U.S. PATENT DOCUMENTS

| | | | | |
|---|---|---|---|---|
| 5,539,729 | A * | 7/1996 | Bodnar | 370/232 |
| 6,252,950 | B1 * | 6/2001 | Duty et al. | 379/111 |
| 6,438,551 | B1 * | 8/2002 | Holmskar | 707/10 |
| 6,469,991 | B1 * | 10/2002 | Chuah | 370/329 |
| 6,496,811 | B1 * | 12/2002 | Bodnar | 706/3 |
| 6,510,214 | B1 * | 1/2003 | McDaniel | 379/134 |
| 6,542,950 | B1 * | 4/2003 | Bodnar | 710/260 |
| 6,907,003 | B1 * | 6/2005 | Gvozdanovic | 370/232 |
| 2004/0165530 | A1 * | 8/2004 | Bedekar et al. | 370/235 |
| 2004/0215753 | A1 * | 10/2004 | Chan et al. | 709/223 |
| 2006/0126507 | A1 * | 6/2006 | Nakayasu | 370/229 |
| 2008/0002575 | A1 * | 1/2008 | Kumar et al. | 370/229 |
| 2009/0185485 | A1 * | 7/2009 | Swami | 370/231 |

FOREIGN PATENT DOCUMENTS

| | | |
|---|---|---|
| EP | 0912015 A3 | 4/1999 |
| EP | 1672845 A1 | 6/2006 |

OTHER PUBLICATIONS

International Search Report for PCT/US2008/008083 dated Feb. 12, 2008.

* cited by examiner

*Primary Examiner*—Kwang B Yao
*Assistant Examiner*—Jung Liu
(74) *Attorney, Agent, or Firm*—McCormick, Paulding & Huber LLP

(57) ABSTRACT

In a method and system for controlling base station processing unit overload and buffer overflow in a unified manner, one or more processing units of the base station are monitored to determine if the processing unit(s) has entered an overload condition. If so, on a per flow basis, the system generates an advertise window for controlling the amount of data in the data flow, as transmitted to the processing unit from an upstream entity. The advertise window is generated taking into consideration both processor overload and buffer overflow factors. By incorporating these factors, the advertise windows collectively serve to limit both processor overload and buffer overflow, on a system wide basis.

18 Claims, 4 Drawing Sheets

METHOD AND SYSTEM FOR UNIFIED OVERLOAD AND OVERFLOW CONTROL TO SUPPORT VOIP AND MULTIPLE QOS FLOW TRAFFIC IN COMMUNICATION NETWORK

FIELD OF THE INVENTION

The present invention relates to communications and, more particularly, to systems for controlling data flow in wireless communication networks.

BACKGROUND OF THE INVENTION

Wireless, radio frequency communication systems enable people to communicate with one another over long distances without having to access landline-connected devices such as conventional telephones. While early systems were primarily configured for voice communications, technological improvements have enabled the development of "3-G" (third generation) and similar wireless networks for both voice and high-speed packet data transfer. For example, CDMA-based, "1x-EVDO" (Evolution Data Optimized, or Evolution Data Only) wireless communication networks, now implemented in many parts of the U.S. and elsewhere, use the CDMA2000® 3-G mobile telecommunications protocol/specification for the high-speed wireless transmission of both voice and non-voice data. 1x-EVDO is an implementation of CDMA2000® that supports high data rates, specifically, forward link data rates up to 3.1 Mbit/s, and reverse link rates up to 1.8 Mbit/s in a radio channel dedicated to carrying high-speed packet data, e.g., a 1.25 MHz-bandwidth (or greater) radio channel separate from the radio channel for carrying voice data.

In 3-G packet data networks, e.g., those using the Internet Protocol ("IP") for data transmission generally and voice over IP ("VoIP") for voice-data transmission, data is broken into a plurality of addressed data packets. For example, with VoIP, analog audio/voice signals are captured, digitized, and broken into data packets. The data packets, both voice and non-voice, are then transmitted and routed over an IP-based communications network, where they are received and reassembled by the access terminal to which the data packets are addressed. Unlike circuit switched systems, however, in which a physical or logical circuit (e.g., pathway) is established for each call (with the resources for the circuit being dedicated to the call during the entirety of its duration), the data packets may be sent at different times, out of order, and/or along different pathways. In this manner, data transmission resources are utilized in a more efficient and optimized manner.

The use of VoIP allows voice services to be integrated with multimedia and other packet data services in a wireless communication network. This facilitates a diversity of applications, and may increase overall system performance. However, wireless networks present a particular challenge to packet voice traffic. Generally speaking, as network load increases, there is an increased likelihood of dropped calls, poor quality calls (e.g., resulting from increased frame error rates), long transmission latencies, and the like, all of which may lead to unacceptable levels of user dissatisfaction. More specifically, the air interface in a wireless network (e.g., the radio link between one or more fixed base stations and various mobile or other wireless access terminals) is dynamic by nature, as is the system capacity and the performance associated with each voice user. Thus, there may be occasions where not enough bandwidth is available to accommodate every active user according to target quality of service ("QOS") levels. Additionally, even if bandwidth is available, there may be times when it is not possible to meet target or required QOS levels in transmitting voice or other data packets to a wireless access terminal, due to varying radio airlink conditions or the like.

In some instances, these problems may be compounded as a result of limitations in network electronic processing capacity. In particular, carrying out wireless packet data communications involves the ongoing electronic processing of large numbers of data packets. For this purpose, each element of network infrastructure (e.g., wireless units, base stations, RNC, MSC, etc.) will typically include one or more microprocessors or other electronic processing units. When network traffic load is heavy, processor resources may be overextended, e.g., in a particular leg/hop of the communication channel there may not be enough processing power to accommodate the data load according to required or target QOS levels. Additionally, with VoIP and multiple QOS applications such as best efforts data transfer and video telephony, there are complex bursty traffic patterns that result in large amplitude levels of loading surge and fluctuation. Loading surge and fluctuation may drive multiple processing devices into overload conditions. During such overload conditions, the processing units and communication buses connected thereto tend to have complex and/or erratic processor overload behaviors. These factors may result in flow drop and dropped packets, resulting in poor quality calls and unacceptable system performance.

SUMMARY OF THE INVENTION

An embodiment of the present invention relates to a system and method for data traffic control in a wireless network, e.g., for controlling base station processing unit overload and buffer overflow in a unified manner. The wireless network includes one or more base stations and one or more upstream network entities, e.g., a radio network controller ("RNC"), connected to the base station(s). The base station includes one or more microprocessors or other processing units, and a plurality of data buffers, which work in a coordinated manner as part of the base station's electronic infrastructure for wirelessly communicating with a set of distributed end user terminals, e.g., mobile phones. The RNC (or other upstream network entity) acts as an interface between the base station and the upstream portion of the network. Thus, as the RNC receives data flows designated for transmission to the end user terminals, the data flows are transmitted to the base station, where they are received at the buffers and processed by the processing unit(s). (A "flow" is a uniquely defined stream of data packets between a source address/port and a destination address/port, wherein the packets are generated according to the same protocol.) In operation, the unified data traffic overload/overflow system monitors the processing unit(s) to determine if the processing unit has entered an overload condition. If so, on a per flow basis (e.g., for each data flow transmitted to the processing unit), the system generates an advertise window for controlling an amount of data traffic transmitted to the processing unit from the RNC or other upstream network entity. "Advertise window" refers to a data amount expressed in units of data, which is sent from a receiver to a transmitter for controlling the amount of data transmitted from the transmitter to the receiver.

In another embodiment, the advertise window (generated for each flow) is a unified processor overload and buffer overflow control window, meaning that the advertise window is generated taking into consideration both processor overload and buffer overflow factors. By incorporating these factors, the advertise windows collectively serve to limit both processor overload and buffer overflow, on a system wide basis.

In another embodiment, the system calculates an overflow window and an overload control window. The overflow window relates to a processing unit buffer, e.g., the overflow window may relate to overflow conditions in a receiving buffer. The overload control window is calculated after the processing unit enters an overload condition, as a function of (i) an amount of data received by the processing unit in a designated time period (e.g., the data is received from the RNC or other upstream entity), (ii) a number of data bursts registered as occurring during the designated time period in association with the processing unit, and (iii) an overload factor relating to the degree of overload of the processing unit. The unified control window is set to the buffer overflow window or the overload control window, whichever is smaller, and is then transmitted to the upstream network entity. The designated time period may be, for example, the time period between when the overload factor is successively updated. Also, by "data burst," it is meant a designated amount of data received at and/or drained from the processing unit, and/or another factor relating thereto, such as the expiration of a timer if the designated amount of data is not received/drained during a designated time period.

In another embodiment, the system monitors the processing unit's occupancy level. The overload factor is generated, at least in part, based on a comparison of the occupancy level to a target occupancy level. As noted above, the overload factor relates to the degree of processing unit overload, including the condition where the processing unit is not in overload. The overload factor is periodically updated. If the processing unit is deemed as having entered an overload condition (e.g., the actual occupancy level exceeds the target level), the system tracks the amount of data going through the processing unit in the interval between successive updates, on a per flow basis. It also tracks the number of data bursts received during the update interval. At the end of the update interval, if the updated overload factor indicates a continuing overload condition, the overload control window is calculated as indicated above, e.g., as a function of the accumulated data, data bursts, and overload condition. A buffer overflow window is also calculated. In the subsequent update interval, each time a data burst is registered as occurring, the system generates and transmits an advertise window to the RNC or other upstream entity. The advertise window is the minimum of the overload control window and the buffer overflow window. Thus, as should be appreciated, the overflow window is controlling unless the overload control window is smaller (and therefore more restrictive on data flow), a condition indicative of substantial data congestion.

In another embodiment, if the overload factor indicates that the processing unit has left the overload condition, the advertise window is set to equal the overflow window. Also, if the processing unit is still in an overload condition, the overload control window is set to 0 if the number of data bursts registered as occurring within the update interval exceeds the number of data bursts registered as having occurred in the previous interval.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
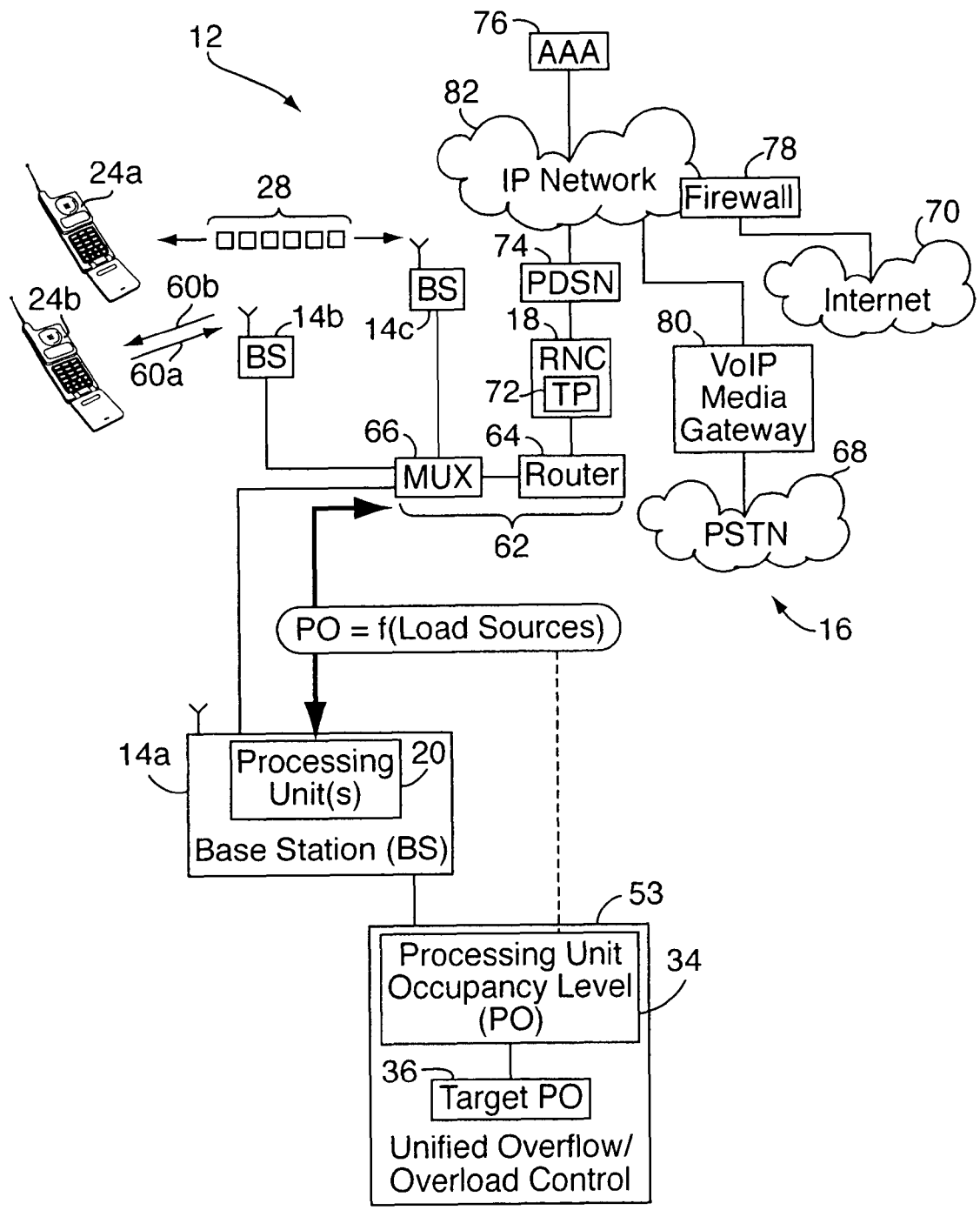
FIGS. 1 and 2 are schematic diagrams of a unified data traffic overload and overflow control system, in the context of a wireless communication network, according to an embodiment of the present invention.

With reference to FIGS. 1-5, an embodiment of the present invention relates to a method and system 10 for data traffic control in a wireless network 12, e.g., for controlling base station processing unit overload and buffer overflow in a unified manner. The wireless network 12 includes one or more base stations 14a-14c and one or more upstream network entities 16, e.g., a mobile switching center or radio network controller ("RNC") 18, connected to the base station(s) 14a-14c. The base station 14a includes one or more microprocessors or other processing units 20, and a plurality of data buffers 22, which work in a coordinated manner as part of the base station's electronic infrastructure for wirelessly communicating with a set of distributed wireless units 24a, 24b, e.g., mobile phones. The RNC 18 acts as an interface between the base station and the upstream portion of the network 12. Thus, as the RNC 18 receives data flows 26 designated for transmission to the wireless units 24a, 24b, the data flows 26 are transmitted to the base station 14a, where they are received at the buffers 22 for processing by the processing unit(s). (As noted above, a "flow" is a uniquely defined stream of data packets 28 between a source address/port and a destination address/port, wherein the packets are generated according to the same protocol. The stream may be uniquely defined in terms of a common source and unique destination, through common flow ID's in the packet headers, or the like.) In operation, the unified data traffic overload/overflow system 10 monitors the processing unit 20 to determine if the processing unit 20 has entered an overload condition. If so, on a per flow basis (e.g., for each data flow 26 transmitted to the processing unit), the system 10 generates an advertise window 30 for controlling the amount of data in the data flow 26, as transmitted to the processing unit 20 from the RNC 18.

Generally speaking, the term "window" describes an amount of bytes, or more generally, a data amount expressed in units of data. An "advertised" or offered window 30 is sent to a transmitting unit from a receiving unit for controlling data flow—the transmitting unit is not allowed to have more unacknowledged packets outstanding than the amount defined by the advertise window. In the system 10, the advertise window 30 is a unified processor overload and buffer overflow control window, meaning that the advertise window is generated taking into consideration both processor overload and buffer overflow factors. By incorporating these factors, the advertise windows 30 generated for controlling the data flows 26 serve to limit both processor overload and buffer overflow, both on a system wide basis and on a per flow basis, for supporting per-used based multi-QOS applications.

As discussed in more detail below, as part of the process for determining when the processing unit 20 enters an overload condition 32, the system: (i) monitors the processing unit's occupancy level 34 in comparison to a target processor occupancy level 36; and (ii) generates one or more overload factors 38. The overload factor 38 relates to the degree of processing unit overload. (As should be appreciated, this includes the condition/state where the processing unit is not in overload.) The overload factor 38 is periodically updated. If the processing unit 20 is deemed as having entered an overload condition, the system tracks the amount of data ("accumulated data") 40 going through the processing unit in the interval 42 between successive updates 44, on a per flow basis. It also tracks the number of data bursts 46 received during the update interval. At the end of the update interval 42, if the updated overload factor 38 indicates a continuing overload condition, an overload control window 48 is calculated. The overload control window 48 is calculated as a function of the accumulated data 40, the number of data bursts 46, and the overload factor 38. A buffer overflow window 50 is also calculated. The buffer overflow window 50 relates to one of the processing unit buffers 22, e.g., the overflow window 50 may relate to overflow conditions in a receiving buffer 52. (It may be the case that the buffer overflow window is calculated on an ongoing, periodic basis.) In the subsequent update interval, each time a data burst is registered as occurring, the system generates an advertise window 30 and transmits it to the RNC 18 or other upstream entity 16. The transmitted advertise window 30 (e.g., the unified processor overload and buffer overflow control window) is the minimum of the overload control window and the buffer overflow window. As noted above, where applicable, this process is carried out on a per flow basis.

The system 10 may be implemented as a hardware module, hardware/software module, or software module 53 (e.g., script or other software program, or suite of software programs), in a standalone manner and/or integrated with the processing units and/or with one or more network components (e.g., the base stations and RNC), for carrying out the method described herein.

Figure 2:
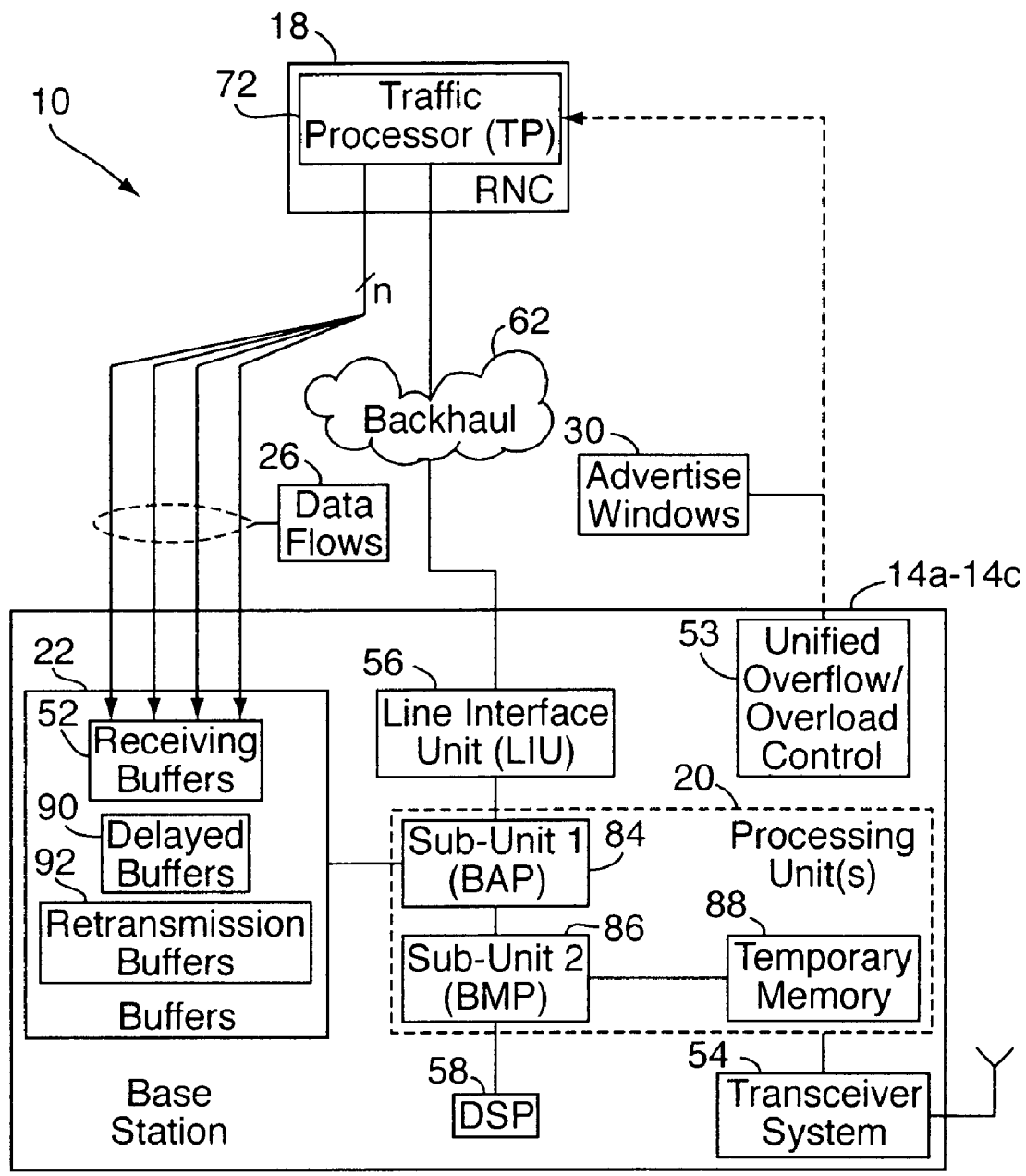

The unified data traffic overload/overflow system 10 is implemented as part of a wireless telecommunication network 12. One example of such a network 12 is shown in FIGS. 1 and 2. In the network, an area of land is geographically divided into a number of cells or sectors (not shown), which are typically contiguous and which together define the coverage area of the network. Each cell is served by a base station ("BS") 14a-14c. Among other possible components, each base station may include one or more processing units 20, a transceiver system 54 (e.g., fixed/stationary transceivers and antennae), a line interface unit ("LIU") 56, and one or more digital signal processors ("DSP") 58. These components are configured to operate in coordination for carrying out wireless communications with a set of distributed wireless units 24a, 24b (e.g., mobile phones) that provide service to the network's users. The LIU 56 acts as a communication interface between the base station 14a-14c and RNC 18, for the transfer of data there between. In conjunction with the DSP 58, the processing unit 20 processes data as required according to the communication protocols in place on the network. The transceiver system 54 includes a number of antennae for receiving and transmitting RF signals, and various electrical sub-components for modulating data signals at radio frequency levels for transmission and reception over the forward and reverse links, respectively.

Various methods exist for conducting wireless communications between base stations 14a-14c and wireless units 24a, 24b. One such method is the CDMA (code division multiple access) spread-spectrum multiplexing scheme, widely implemented in the U.S. under various standards as discussed above. In a CDMA-based network, transmissions from wireless units to base stations are across a reverse link 60a, which is a 1.25 MHz (or greater) frequency bandwidth centered at a first designated frequency. Generally, each wireless unit is allocated the entire bandwidth all of the time, with the signals from individual wireless units being differentiated from one another using an encoding scheme. Transmissions from base stations to wireless units are across a forward link 60b, which is a similar 1.25 MHz (or greater) frequency bandwidth centered at a second designated frequency. The forward and reverse links may each comprise a number of traffic channels and signaling or control channels, the former primarily for carrying data, and the latter primarily for carrying the control, synchronization, and other signals required for implementing CDMA communications. Thus, in the case of CDMA communications, the processing unit 20 may be configured to separate and decode spread-spectrum signals received over the airlink, and to combine and encode signals for transmission over the airlink, among other functions.

The base stations 14a-14c are in turn connected to the RNC 18 over a "backhaul" communication pathway 62. For example, the backhaul 62 might include a concentrator router 64 and a high capacity multiplexer ("MUX") 66, wherein data received at the RNC 18 is forwarded to the concentrator router 64 and then over a high capacity line to the MUX 66 for transfer to the base stations 14a-14c. The RNC 18 acts as the interface between the wireless/radio end of the network 12 and various internal and external networks such as a public switched telephone network ("PSTN") 68 and the Internet 70. The RNC 18 includes a traffic processor unit ("TP") 72 for performing the signaling functions necessary to establish calls or other data transfer to and from the wireless units 24a, 24b. For high-speed data transmission to and from the Internet 70 or elsewhere (e.g., for facilitating web browsing, real time file transfer, or downloading large data files), the network 12 may use the Internet Protocol, where data is broken into a plurality of addressed data packets 28. For use in transferring packet data 28 between the network 12 and other networks such as the Internet 70, the wireless network 12 may include a packet data serving node ("PDSN") 74 for routing wireless unit-originated or terminated packet data, an authentication, authorization, and accounting module ("AAA") 76, one or more firewalls 78, and a VoIP media gateway 80 that converts VoIP transmissions into a format suitable for transfer over the PSTN 68 (e.g., analog voice signals) and vice versa. The network 12 may also include a core IP network portion 82 for internal landline communications between different elements of the network, e.g., between the RNC 18 and the AAA module 76 or other service center.

Although the base stations 14a-14c are described above as each having one processing unit 20, it is more typically the case that each includes a number of processing units, depending on the capacity of the base station. When a call or other communication is newly initiated, one of the processing units is temporarily assigned to process the call. When the call is terminated, the processing unit is freed up, and may be assigned to process another call. Additionally, as shown in FIG. 2, each processing unit 20 may include one or more processing sub-units 84, 86, as well as temporary memory 88 such as RAM. In this example, the first processing sub-unit 84 ("BAP") acts as a processing interface with the LIU 56 (which itself may be considered a processing sub-unit), while the second processing sub-unit 86 ("BMP") functions as a processing interface with the DSP 58 and temporary memory 88. (Such configurations are found, for example, in the Lucent Technologies®/Qualcomm® single-board 1x-EV modem.) According to the present invention, processor occupancy level may be monitored with respect to the processing unit 20 as a whole, and/or with respect to each processing sub-unit 84, 86. For illustrative purposes, the unified data traffic overload/overflow system 10 and associated method will be further described in terms of monitoring processor overload for a particular one (or a plurality) of the processor sub-units such as shown in FIG. 2. However, the method may be applied to processing units having different configurations. Additionally, unless other specified herein, the term "processing unit" generally refers to any electronic module having signaling and data processing functionality, whether it be a processing sub-component of a larger processing unit or a unit that itself has one or more processing sub-components.

As noted above, the system 10 incorporates considerations of buffer overflow, for controlling buffer overflow and processor overload in a unified manner, on a per flow basis. As shown in FIG. 2, for example, for each data flow 26, three buffers are uniquely allocated to the data flow 26: a receiving buffer 52, a delayed ACK buffer 90, and a retransmission buffer 92. (For simplicity of illustration, the buffers 22 and data flows 26 are shown in the aggregate in FIG. 2.) Typically, each buffer, and especially the receiving buffer 52, has its own overflow control. For example, the overflow control for the data flow between the RNC TP 72 and the receiving buffer 52 may be a simple window control. Here, for every "x" bytes drained from the receiving buffer 52 (e.g., the bytes are transmitted from the receiving buffer to a downstream entity such as the BAP 84), where "x" is a designated number, the BAP 84 sends an overflow advertise window 50 of "x" bytes to the RNC TP 72. If no "x" bytes are drained within a designated "y" milliseconds, an overflow advertise window 50 is transmitted to the RNC TP 72, with a size of:

overflow advertise window=(receiving buffer size)−(buffer backlog)

In other words, the overflow advertise window 50 in this case equals the space remaining in the receiving buffer 52. As should be appreciated, the overflow windows 50 are periodically (potentially irregularly) calculated, when a designated "x" bytes are drained, or at a designated "y" milliseconds (from when the last overflow window was calculated) if "x" bytes are not drained within that time period. It should be noted that in the system 10, although overflow windows 50 (e.g., see "W_que" discussed below) are calculated on an ongoing basis as part of the process for generating the unified advertise window 30 (e.g., see window "W" discussed below), the unified advertise window 30 supplants the overflow windows 50. In other words, overflow windows are not transmitted to the RNC or otherwise except for the case, discussed below, when the value of the unified advertise window is set to equal the calculated overflow window.

While buffer overflow control is generally carried out on a per flow basis, because processor occupancy depends on aggregated traffic, processor overload control relates to the control of aggregated data traffic passing through the processor in question. Thus, the system 10 monitors and controllably reduces the amount of data being processed by a network microprocessor or other electronic processing unit 20 during times of heavy network traffic (e.g., if the processing unit becomes overloaded), thereby reducing incidents of data loss, data delay, and the like. Processing unit overload may be monitored: (i) for the processing unit 20 as a whole, or for one or more of the sub-units 56, 84, 86; and (ii) on a per-airlink basis, for both the forward link ("FL") 60b and the reverse link ("RL") 60a.

If the network 12 utilizes differentiated QOS levels, within each per-link, individually assigned processing unit and/or sub-unit, there exist multiple data flows that include BE (best efforts) flow, AF (assured forwarding) flows, and EF (expedited forwarding) flows. EF, AF, and BE flows are implemented according to a set of scheduling and queueing schemes, in a standard manner, such as those defined by the IETF "DiffServ" standard. Designated EF flows provide a low loss, low latency, low jitter, assured bandwidth, and end-to-end service through the network 12, e.g., akin to a point-to-point connection or "virtual leased line." Designated AF flows have a minimum rate guarantee and low loss rate. BE flows are transmitted at the best efforts of the network, typically without system monitoring or guaranteed rates. For bearer traffic packets (e.g., packets carrying user data as opposed to network signaling data), these can be simplified as: BE flows, for any applications that do not have stringent delay requirements; EF flows, for applications with stringent delay constraints (e.g., VoIP packets, which need to be processed and delivered at a minimum delay); and AF flows, for applications with less stringent delay constraints, e.g., VT for assured bandwidth allocation. Since BE flows do not have stringent delay constraints, the system 10 controls BE flows first. EF and AF flows are impacted only if control of the BE flows is insufficient to reduce the processor load to a desired level.

The overload control and monitoring parameters used in the system are as follows:
AF: Acceptance fraction
PO: Processor occupancy (measured/actual)
$PO^*_{BE\_FL}$, $PO_{BE\_RL}$: PO for BE flows per link
$PO_{EF}$: PO for EF flows In the system 10, the processor occupancy level (PO) 34 of each of the processing units (e.g., BAP 84, BMP 86, and LIU 56) is measured/monitored on an ongoing basis, for determining when the processing units enter overload, and for quantifying the degree of overload by way of one or more overload factors 38.

Figure 4:
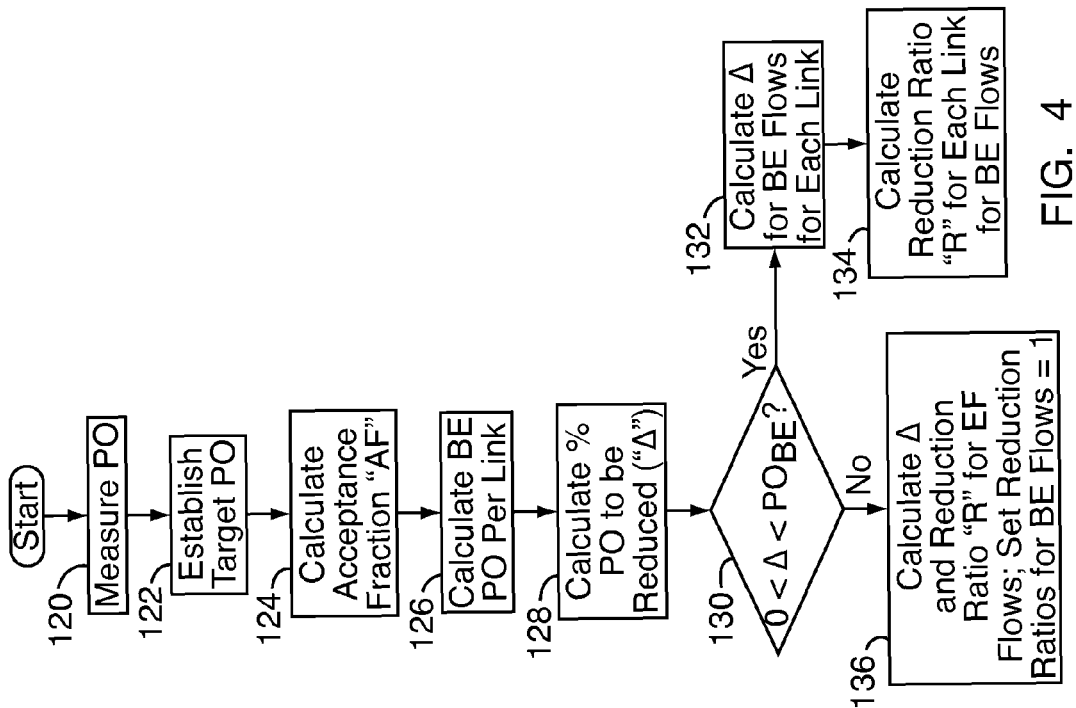

For each processing unit, e.g., the BAP 84, the PO level 34 of the processing unit is periodically measured, as at Step 120 in FIG. 4. This may be done by initiating a reporting function, subroutine, or utility program of the processing unit, or by way of a direct calculation based on the number of data packets processed by the processing unit. At Step 122, a target PO 36 ("$PO_{Target}$") is chosen. (The target PO may be a set or pre-established value.) This is a translation parameter with a range, for example, of 70%-90%, with a default value of 85%. At Step 124, the acceptance fraction "AF" is calculated according to the following:

$$f_{PO} = PO_{Target}/PO$$

$$f = AF_{t-1} \cdot f_{PO}$$

$$AF_t = \max[\min(f, 1), f_{min}]$$

Here, $AF_{t=0}=1$, and $f_{min}$ is a constant value, e.g., 0.02, representing a minimum value for AF. $AF_t$ is updated every T seconds, wherein T is a tunable parameter in the range of, e.g., 1 to 10 seconds with a default value of 1 second. Thus:
At t=1:

$$f = PO_{Target}/PO$$

$$AF_1 = \max[\min(PO_{Target}/PO, 1), 0.02]$$

IF $PO \leq PO_{Target}$, THEN AF=1
ELSE $PO > PO_{Target}$, THEN $0.02 \leq AF < 1$ As should be appreciated, if the measured PO level 34 does not exceed the target PO 36, then the acceptance factor AF will remain at 1. If the measured PO level 34 exceeds the target PO 36, then the acceptance factor AF will be a value between $f_{min}$ and 1. The acceptance factor AF thus acts as a measure of the extent to which the measured PO 34 exceeds the target PO 36, for use in controllably reducing BE flows, and possibly EF/AF flows.

At Step 126, the BE flow PO level per link is calculated, that is, the percentages of processor occupancy due to BE flows on the forward and reverse links are calculated, as follows:

$$PO_{BE\_FL}=NP_{BE\_FL} \cdot PO_{BEPK\_FL}$$

$$PO_{BE\_RL}=NP_{BE\_RL} \cdot PO_{BEPK\_RL}$$

Here, $NP_{BE\_FL}$ and $NP_{BE\_RL}$ are the average number of FL and RL BE packets passing through the processor in the last T seconds, respectively, where T is the same tunable parameter as used for calculating the acceptance factor AF. $PO_{BEPK\_FL}$ is the pre-calibrated average PO for one BE FL packet, and $PO_{BEPK\_RL}$ is the pre-calibrated average PO for one BE RL packet, both of which may be obtained through laboratory testing of the processing unit in question. Average values are only one type of statistical method usable in this process; virtually any statistic and adaptive filtering method can be applied to achieve desired accuracy for minimizing the difference between the actual and estimated values.

At Step 128, a value "$\Delta$" is calculated, which represents the percentage PO to be reduced. $\Delta$ is calculated as:

$$\Delta=(1-AF) \cdot PO$$

As should be appreciated, if AF=1 (meaning that the measured PO does not exceed the target PO), then $\Delta=0$, meaning that the PO is not to be reduced. As AF approaches its minimum value of $f_{min}$ (e.g., 0.02), $\Delta$ increases to a maximum value of $(1-f_{min}) \cdot PO$, e.g., $0.98 \cdot PO$ (that is, 98% of the PO is to be reduced).

At Step 130, it is determined if $\Delta$ is less than or equal to $PO_{BE}$, where $PO_{BE}$ is the processor occupancy level due to BE flows and $PO_{BE}=PO_{BE\_FL}+PO_{BE\_RL}$. (In other words, the processor occupancy due to BE flows is equal to the total processor occupancy due to BE flows on the forward and reverse links.) If so, then at Step 132 a $\Delta$ value (e.g., percentage reduction) is calculated for BE flows for each link, as follows:

IF $0<\Delta \leq PO_{BE}$

THEN $$\Delta_{BE\_FL}=\alpha \cdot \Delta \cdot (PO_{BE\_FL}/PO_{BE})$$

$$\Delta_{BE\_RL}=\Delta-\Delta_{BE\_FL}$$

Here, "$\alpha$" is a tunable parameter in the range of, e.g., 1 to 1.5 with a default value of 1. Subsequently, at Step 134 a reduction ratio "R" is calculated for BE flows on each link, as follows:

$$R_{BE\_FL}=\Delta_{BE\_FL}/PO_{BE\_FL}$$

$$R_{BE\_RL}=\Delta_{BE\_RL}/PO_{BE\_RL}$$

Additionally, since EF flows are not impacted when a reduction in BE flows will be sufficient to remedy the overload condition (e.g., if $0<\Delta \leq PO_{BE}$), the following values are assigned in relation to EF flows:

$$\Delta_{EF}=0$$

$$R_{EF}=0$$

Referring back to Step 130, if $\Delta>PO_{BE}$ (e.g., if the percentage of PO to be reduced is greater than the percentage of processor occupancy due to BE flows), then at Step 136 a "$\Delta$" value and reduction ratio are determined for EF flows, as follows:

ELSE $\Delta>PO_{BE}$ $$\Delta_{BE\_FL}=PO_{BE\_FL}$$

$$\Delta_{BE\_RL}=PO_{BE\_RL}$$

$$R_{BE\_FL}=1$$

$$R_{BE\_RL}=1$$

$$\Delta_{EF}=\Delta-\Delta_{BE\_FL}-\Delta_{BE\_RL}$$

$$R_{EF}=\Delta_{EF}/(PO-PO_{BE\_FL}-PO_{BE\_RL})$$

Subsequent to either Step 134 or Step 136, as the case may be, there will be a set of reduction ratios "R" for EF flows and BE flows ($R_{BE\_FL}$, $R_{BE\_RL}$, and $R_{EF}$), calculated according to the formulas above, for each processing unit/sub-unit of interest. These parameters, in addition to the other parameters discussed above, are used to controllably reduce processor occupancy level, and for generating the unified advertise windows 30. First, in the system 10, new call admission is controlled based on the $\Delta$ value, which, as noted above, represents the percentage PO to be reduced. If the acceptance fraction AF is less than 1 (representing a measured PO 34 that exceeds the target PO 36), then $\Delta>0$. Accordingly, with reference to FIG. 5, at Step 140 it is determined if $\Delta>0$ for the BMP sub-unit 86 and/or the BAP sub-unit 84. If so, at Step 142 the RNC 18 is instructed to temporarily halt the admission of newly initiated calls/communications for processing by the processing unit 20. At the same time, an overload flag is set to "1" (indicating an overload condition). If not, then at Step 144 is it determined if the overload flag is set to "1." If so, at Step 146 it is determined if the measured PO is less than a value $PO_{NEW}$, where $PO_{NEW}$ is a designated tunable parameter 26 in the range of (1-10%) $PO_{Target}$ to $PO_{Target}$, with a default value of $PO_{Target}$. If so (e.g., if it is determined that the measured PO level has fallen below the target PO or another designated PO), then at Step 148 the RNC 22 is instructed to admit new calls/communications, and the overload flag is set to "0." The process ends at Step 150, until continued as at Step 120 in FIG. 4 at the next time interval T.

For unified overflow and overload control, for the first time the monitored processing unit(s) enters an overload condition 32 (see FIG. 3), and when a new R>0 overload factor 38 is generated/received, and until the processing unit is out of overload, the system accumulates the amount of data 40 processed by the processing unit within the update interval 42 of "R" (the reduction ratio/overload factor) and the number of data bursts 46 received or otherwise registered as occurring within the update interval 42. An overload control window 48 is updated as: (total bytes received within update interval of R)/(number of bursts over the last update interval of R)×(1−reduction ratio "R" from overload control). (The preceding provides a method to change the PO reduction ratio R to units of bytes, thereby aligning the overload control window with the overflow window, also in units of bytes.) The overload control window 48 will be set to 0 if the number of bursts within the current update interval exceeds the previous one. As such, the number of times that the overload control window can be sent within the update interval 42 of R is in effect capped by the number of bursts 46 received in the last update interval of R. (Specifically, as indicated below, if the number of bursts in the current update interval exceeds the number of bursts in the last update interval, and if R>0, the overload control window is set to zero.) The advertise window 30 transmitted to the RNC TP 72 is the minimum of the overload control window and the receiving buffer overflow window 50 (which is periodically calculated as described above).

The process for generating unified advertise windows 30 will now be explained in more detail, for one embodiment of the present invention. The following parameters are used in the system:

Queue: BE FL receiving queue (for example)
Acc_bytes: accumulated bytes 40 received from the RNC TP 72 by BAP 84 within PO reporting interval 42.
N_FCI: counter of FCI triggers within PO reporting interval, e.g., the number of bursts 46. An FCI trigger is an interrupt generated by system hardware/software when either a designated amount of data is drained (e.g., 4 Kbytes) or if the designated amount of data is not drained within a designated time period (the FCI timer).
W_que: existing window 50 for buffer overflow control.
W_oc: overload control window.
W: unified advertise window 30, e.g., the window transmitted to RNC TP 72.
Drained-Bytes:
Drained_bytes=4K (tunable parameter) if FCI is triggered by 4K drain.
Drained_bytes=2 KByte×global FCI expiration time (tunable, 500 ms currently) if FCI is triggered by global FCI timer.
R: PO reduction ratio=max (R_LIU, R_BAP, R_BMP), where "R_xxx" is the PO reduction ratio for processing sub-unit "xxx."

Figure 3:
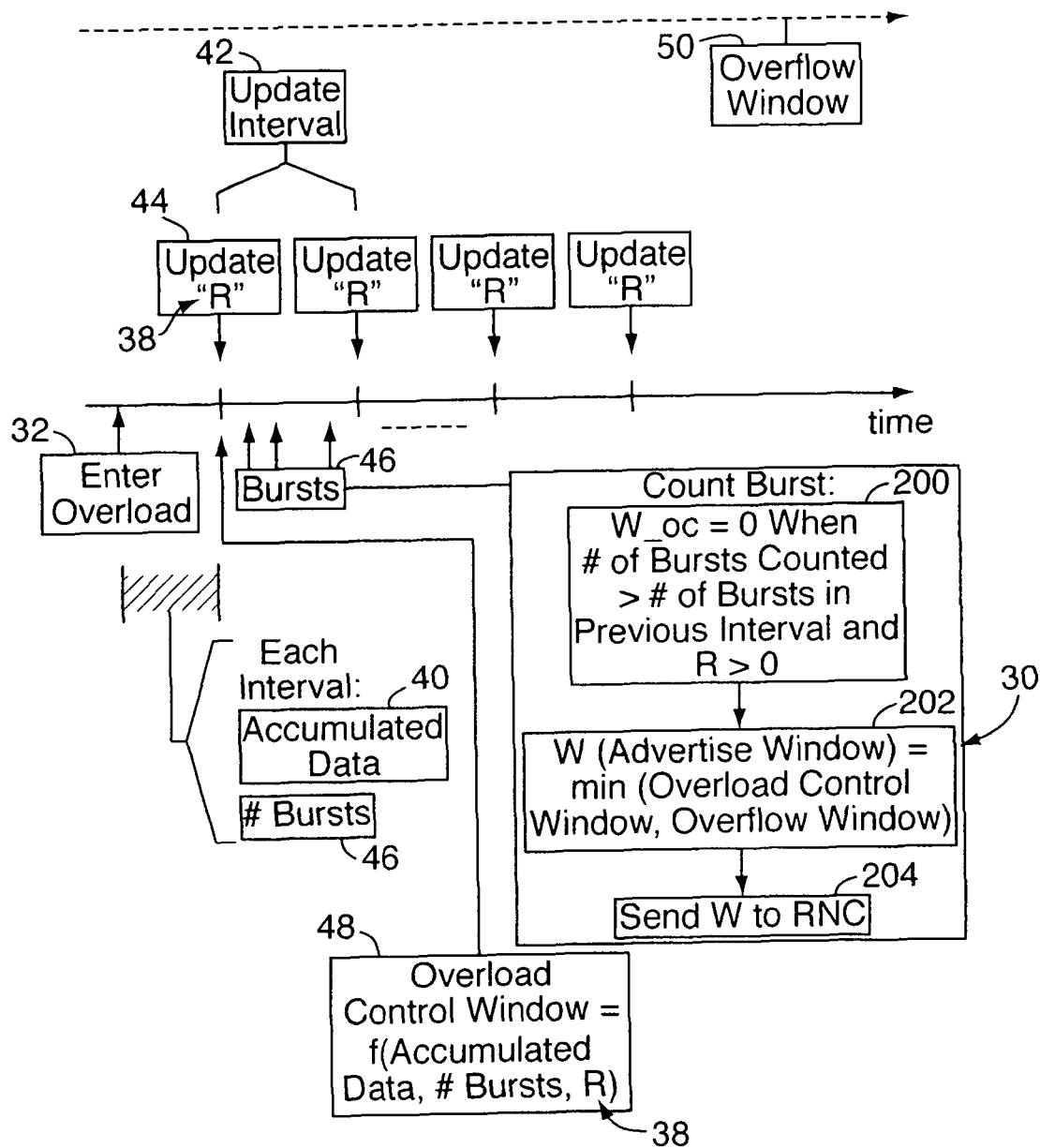
FIG. 3 is a timeline, shown in simplified form, of the system in operation.
Figure 5:
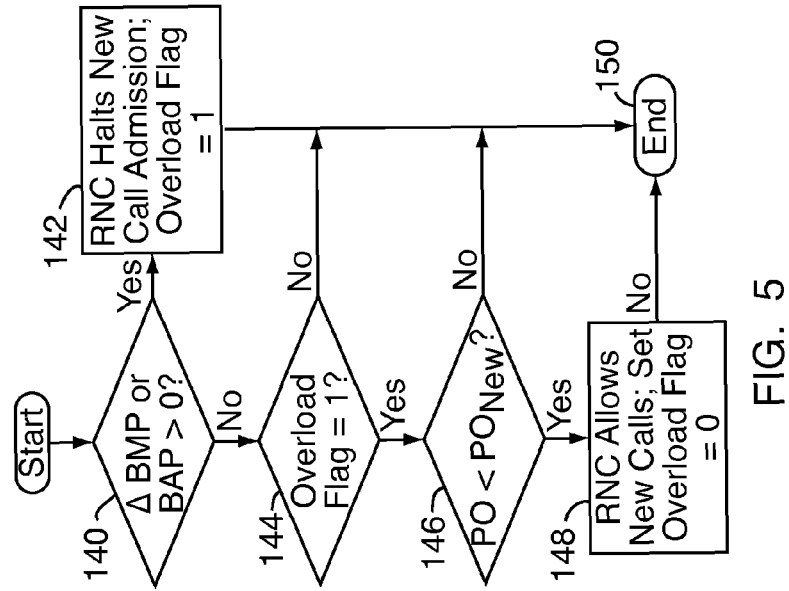
FIGS. 4 and 5 are flow charts showing aspects of the system in operation.

As discussed above, the system monitors the processing unit(s) of interest for determining when the processing unit enters an overload condition 42. As part of this process, an overload factor (e.g., "R") 38 is periodically generated. In particular, the PO reduction ratio "R" is calculated for each processing unit/sub-unit of interest on an ongoing basis, e.g., the BAP, LIU, and/or BMP, in a manner as described above. The maximum of these values is used as the overload factor "R" for the process below (namely, R =max (R_LIU, R_BAP, R_BMP)), it being recognized that using the maximum reduction ratio of all the processing sub-units counteracts overloading for all the processing sub-units. The interval between successive updates is shown in FIG. 3 as the "update interval" 42. Overflow windows 50 are also periodically calculated as discussed above. Until the processing unit comes out of overload, and upon first entering processor overload (as at 32 in FIG. 3), or each time a new overload factor (e.g., R>0, R=max (R_LIU, R_BAP, R_BMP)) is received/generated (at 44 in FIG. 3):

```
{
W_que_old = W_que          // "W_que_old" is set to the current overflow
                           // control window (W_que).
IF first entering overload // See 32 in FIG. 3.
    {
    Acc_bytes = 0          // Resets count of accumulated bytes received
                           // by processor within processor occupancy
                           // (PO) reporting interval.
    N_FCI = 0              // Resets burst counter.
    W_oc = 4k              // Overload control window (W_oc) set
                           // to default value when no R is
                           // available.
    }
ELSE if R > 0              // Reporting of R commences one
                           // reporting interval after entering
                           // overload. The following steps occur
                           // each time a new R is received.
    {
    Acc_bytes = Acc_bytes + W_que_old − W_que
    W_oc = Acc_bytes / (N_FCI · (1 − R))   // Calculate W_oc.
    Acc_bytes = 0          // Reset count of accumulated bytes.
    N_FCI_old = N_FCI      // During the current reporting
                           // interval, "N_FCI_old" represents the
                           // count of the previous reporting
                           // period's bursts. Here, at the
                           // beginning of the new interval,
                           // the burst count of the previous
                           // interval (N_FCI) is moved to
                           // N_FCI_old.
    }
}
```

As indicated, each time an R>0 is received (where R=max (R_LIU, R_BAP, R_BMP)), as at 44 in FIG. 3, the overload control window 48 is updated as W_oc=(Acc_bytes/N_FCI)·(1−R). Thus, as should be appreciated, W_oc is a function of the accumulated bytes 40, the number of data bursts 46, and the overload factor 38, e.g., "R." Once W_oc is calculated, the accumulated data count 40 and number of bursts 46 are reset, since a new interval 42 is being entered.

Each time an FCI trigger 46 is received (or each time the system otherwise registers a burst as having occurred), the following steps are carried out:

```
{
Acc_Bytes = Acc_Bytes + Drained_Bytes   // Accumulate the amount
                                         // of data drained from the
                                         // processing unit.
N_FCI = N_FCI + 1                        // Increment burst counter.
IF (R > 0)
    {
    IF N_FCI > N_FCI_old
        W_oc = 0                         // Set overload control window (W_oc)
                                         // to 0 if number of busts (N_FCI) within
                                         // the current update interval of R
                                         // exceeds previous one (N_FCI_old).
                                         // See Step 200 in FIG. 3.
    ELSE
        W_oc = W_oc                      // If N_FCI < N_FCI_old, then no
                                         // change to W_oc.
    }
    W = min (W_oc, W_que)                // Unified advertise window 30 sent to
                                         // RNC is the minimum of all the
                                         // overload control windows (W_oc)
                                         // and the receiving buffer overflow
                                         // window (W_que). See Step 202
                                         // in FIG. 3.
ELSE                                     // Here, R = 0.
    W = W_que                            // If R = 0, the window 30 sent to RNC is
                                         // the receiving buffer overflow window
                                         // (W_que).
Send W                                   // Send unified advertise window W to
                                         // RNC. Step 204.
}
```

As should be appreciated, there is a one-to-one association between W_oc and W_que for the unified advertise window W. As the overload condition is updated periodically, W_que is generated by FCI interrupts/triggers. To align overload control and overflow control, an overload control window W_oc is determined for each W_que (e.g., for each FCI), for W. For each W_que, the value of W_oc is either 0 or W_oc=(Acc_bytes/N_FCI)·(1−R). In particular, the latter is calculated once at each R update time (assuming R>0), and is used "N_FCI_old" times in comparing with W_que. Thus, in a current update interval, if R>0: (i) for the first "N_FCI_old" FCI triggers, the value of W_oc remains the same as calculated at the beginning of the update interval; and (ii) for subsequent FCI triggers (e.g., if N_FCI>N_FCI_old), W_oc is set to 0.

As noted above, the system 10 may be implemented as a hardware module, hardware/software module, script or other software program, or suite of software programs 53. The system 10 may be centralized, and possibly including one or more distributed sub-routines or utility programs operating in different parts of the network 12 for reporting and control purposes. Alternatively, the system 10 may be distributed about the network, e.g., in place in multiple iterations at each processing unit or sub-unit. In either case, the system is integrated with the processing units and/or with one or more network components (e.g., the base stations and RNC) for carrying out the methods described herein.

Since certain changes may be made in the above-described method and system for unified overload and overflow control to support VoIP and multiple QOS flow traffic in a communication network, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method of data traffic control in a wireless network, said method comprising:
    determining if a base station processing unit has entered an overload condition; and, if so,
    generating an advertise window for controlling an amount of data traffic transmitted to the processing unit from an upstream network entity, on a per flow basis, wherein the advertise window is a unified processor overload and buffer overflow control window, wherein the unified control window is calculated as a function of (i) an amount of data received by the processing unit in a designated time period, (ii) a number of data bursts registered as occurring during the designated time period, and (iii) an overload factor relating to a degree of overload of the processing unit.

2. The method of claim 1 wherein the designated time period is a reporting interval of the overload factor.

3. The method of claim 2 further comprising:
    comparing a periodically measured processor occupancy level (PO) of the processing unit to a target PO; and
    calculating the overload factor based on said comparison, as a function of the measured PO and the target PO.

4. The method of claim 1 further comprising:
    calculating an overflow window relating to a buffer of the processing unit; and
    calculating an overload control window as a function of (i) an amount of data received by the processing unit in a designated time period, (ii) a number of data bursts registered as occurring during the designated time period, and (iii) an overload factor relating to a degree of overload of the processing unit,
    wherein the unified control window comprises a selected one of the buffer overflow window and the overload control window, whichever is smaller.

5. The method of claim 4 wherein the designated time period is a reporting interval of the overload factor.

6. The method of claim 5 further comprising:
    comparing a periodically measured processor occupancy level (PO) of the processing unit to a target PO; and
    calculating the overload factor based on said comparison, as a function of the measured PO and the target PO.

7. The method of claim 1 further comprising:
    calculating an overflow window relating to a buffer of the processing unit; and
    calculating an overload control window as a function of (i) an amount of data received by the processing unit in a designated time period, (ii) a number of data bursts registered as occurring during the designated time period, and (iii) an overload factor relating to a degree of overload of the processing unit,
    wherein the advertise window comprises a selected one of the buffer overflow window and the overload control window, whichever is smaller.

8. The method of claim 7 further comprising:
    determining if the processing unit has left the overload condition, based on the overload factor; and, if so,
    setting the advertise window equal to the buffer overflow window.

9. The method of claim 7 further comprising:
    determining if the number of data bursts registered as occurring during the designated time period exceeds a number of data bursts registered as having occurred in a prior designated time period; and, if so,
    assigning a zero value to the overload control window.

10. The method of claim 1 further comprising:
    assigning a zero value to the advertise window if a number of data bursts registered as occurring during a designated time period exceeds a number of data bursts registered as having occurred in a prior designated time period.

11. The method of claim 10 further comprising:
    transmitting the advertise window to the upstream network entity each time a data burst is registered as having occurred during the designated time period.

12. A method of controlling data traffic in a wireless network, said method comprising:
    generating an overload factor relating to a degree of overload of a base station processing unit; and
    based on the overload factor, for each of a plurality of data flows transmitted to the processing unit from an upstream network entity, generating an advertise window for controlling the data flow, wherein the advertise window is a unified processor overload and buffer overflow control window, wherein the unified control window is calculated as a function of (i) an amount of data received by the processing unit in a designated time period, (ii) a number of data bursts registered as occurring during the designated time period, and (iii) an overload factor relating to a degree of overload of the processing unit.

13. The method of claim 12 wherein:
    the advertise window is generated each time the overload factor is updated, said overload factor being updated at regular intervals; and
    the advertise window is transmitted to the upstream network entity each time a data burst is registered as having occurred during a current time period between successive ones of said regular intervals.

14. The method of claim 13 further comprising:
    assigning a zero value to the advertise window if a number of data bursts registered as occurring during the current time period exceeds a number of data bursts registered as having occurred in a prior time period.

15. The method of claim 14 further comprising:
    calculating an overflow window relating to a buffer of the processing unit; and
    calculating an overload control window as a function of (i) an amount of data received by the processing unit in said time period, (ii) a number of data bursts registered as occurring during said time period, and (iii) the overload factor,
    wherein the advertise window comprises a selected one of the buffer overflow window and the overload control window, whichever is smaller.

16. The method of claim 12 further comprising:
calculating an overflow window relating to a buffer of the processing unit; and
calculating an overload control window as a function of (i) an amount of data received by the processing unit in a designated time period, (ii) a number of data bursts registered as occurring during the designated time period, and (iii) the overload factor,
wherein the advertise window comprises a selected one of the buffer overflow window and the overload control window, whichever is smaller.

17. The method of claim 16 further comprising:
transmitting the advertise window to the upstream network entity each time a data burst is registered as having occurred during the designated time period.

18. A method of unified buffer overflow and processor overload control in a wireless communication network, said method comprising:

monitoring a load condition of a base station processing unit; and
subsequent to the processing unit entering an overload condition, for each of a plurality of data flows transmitted to the processing unit from an upstream network entity, transmitting an advertise window to the upstream network entity for controlling the data flow,
wherein the advertise window comprises a selected one of a buffer overflow window and an overload control window, whichever is smaller, said overflow window relating to an overflow condition of a buffer of the processing unit, and said overload control window being calculated as a function of (i) an amount of data received by the processing unit in a designated time period, (ii) a number of data bursts registered as occurring during the designated time period, and (iii) the overload condition of the processing unit.

* * * * *